March 17, 1936.                    A. O. PITNER                    2,034,534
             PROCESS AND APPARATUS FOR ASSEMBLING AND FITTING
                 THE ELEMENTS OF NEEDLE OR ROLLER BEARINGS
                            Filed Oct. 1, 1934
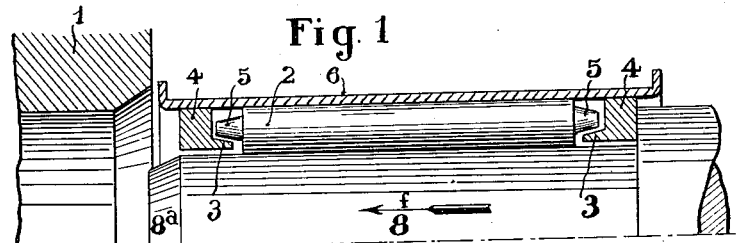
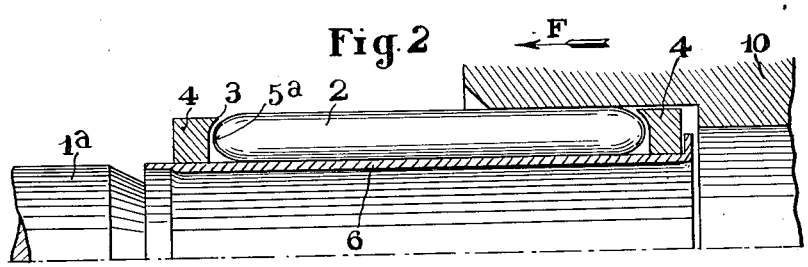
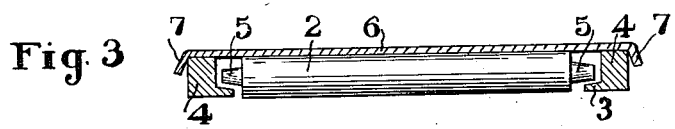
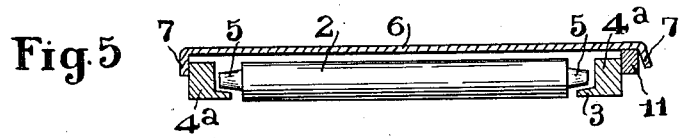
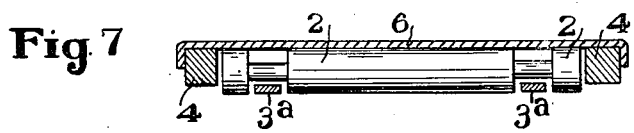
INVENTOR.
ALFRED O. PITNER
BY  Kwis Hudson & Kent
ATTORNEYS Patented Mar. 17, 1936

2,034,534

UNITED STATES PATENT OFFICE 2,034,534

PROCESS AND APPARATUS FOR ASSEMBLING AND FITTING THE ELEMENTS OF NEEDLE OR ROLLER BEARINGS

Alfred Otto Pitner, Paris, France

Application October 1, 1934, Serial No. 746,431
In France December 7, 1933

15 Claims. (Cl. 29—84)

The present invention relates to roller bearings or needle bearings, and more especially to bearings of this kind provided with axial thrust rings and devices for maintaining the needles or rollers on their runways.

The object of the present invention is to provide a method and device for assembling and fitting in position the elements of said bearings.

According to the present invention, I provide a temporary sleeve, made for instance of a thin metal part or the equivalent, and the thrust rings, together with their securing means, and the needles or rollers are temporarily fixed, in the order that they must occupy when working, on said sleeve, so that the whole can now be handled without any risk of one of the elements being lost or the parts assuming defective relative positions. It follows that, when fitting the bearing, it suffices, after having removed any obstacle to the removal of the parts from the temporary sleeve, to cause the whole to slide axially, so as to separate it from the temporary sleeve and to fit it on the organ that is to carry it definitively.

Preferred embodiments of the present invention will be hereinafter described, with reference to the accompanying drawing, given merely by way of example, and in which:

Fig. 1 is an axial sectional view of a needle bearing with its temporary sleeve, illustrating how the bearing can be fitted in the case in which the axial fixation means of the bearing must be fitted in a cylindrical bore;

Fig. 2 is a similar view, corresponding to the case in which the axial fixation means of the bearing are to be fixed on a shaft;

Figs. 3 to 7 inclusive illustrate modifications of the invention.

In the example of Fig. 1, I designates the piece that is intended to carry one of the runways of the needles, which are to be kept in this runway by the flanges 3 of the axial maintaining rings 4 acting on the ends 5 of the needles.

According to the present invention, the elements of the bearing are first assembled in the relative positions that they are to occupy. In order to make it possible to keep them assembled in this way until they are finally mounted on the machine part for which they are intended, these elements are mounted on a thin metal sleeve 6 (Fig. 1) which temporarily plays the part of the piece I in which the fixation rings 4 of the bearing are to be fitted.

Rings 4 are kept in position in sleeve 6 through any suitable means, for instance by a slight wedging or by a permanent or elastic deformation 7 of the sleeve, as shown in Figs. 3, 4 and 5. I may also provide a kind of plug at the end of the sleeve, as shown at 9 in Fig. 6.

In order to fit in position the bearing thus assembled, I operate as follows (Fig. 1):

I slip in the bearing, kept assembled by sleeve 6, a spindle 8, which may have a temporary action or may be the part that is to cooperate with piece I through the bearing. This spindle is preferably slightly bevelled at its end 8ª. After having removed any obstacle to the removal of the parts from sleeve 6, the whole is brought into coaxial position with respect to the bore of piece I (Fig. 1) and spindle 8 is pushed in the direction of arrow f so as to bring the bearing into its definitive position. The empty sleeve 6 is now separated from the bearing and the fitting of the bearing is completed in the usual manner.

In the example of Fig. 2, the operations are quite similar, with the difference that in this case the thrust rings are to be fixed on a shaft 1ª.

In this example, the parts of the bearing are mounted on the outer surface of sleeve 6. After having removed any obstacle capable of opposing the sliding of the parts on the sleeve, and for instance removed the flange provided on the left hand end of sleeve 6, the whole of the bearing is driven in the direction of arrow F, for instance by means of an auxiliary annular member 10.

From the preceding explanations it results that sleeve 6 permits of easily handling and transporting the parts of the bearing, grouped in their relative positions. When the bearing is fixed in position, the sleeve prevents the separation of the elements of the bearing, which are then allowed to leave the sleeve owing to an elastic or permanent deformation of said sleeve or, more generally, by the removal of any obstacle capable of opposing the sliding of the elements with respect to said sleeve.

Of course, the sleeve may be given different shapes, some of which are illustrated by way of example in Figs. 3 to 7 which, in point of fact, correspond as well to the case in which the elements of the bearing are fitted on the outer surface of the sleeve as to the case in which they are mounted on the inner surface thereof.

In the example of Fig. 3, sleeve 6 is made of exactly the same diameter as the axial thrust pieces 4, which thus bear exactly against its surface. But, (as shown by Figs. 4 and 5) the diameter of rings 4ᵃ may also be quite different from the diameter of sleeve 6. The sleeve may also be provided with accessory parts, for instance pieces 11 intended to maintain the axial thrust pieces after the rings 4 have been fitted in position on sleeve 6.

The method according to the present invention can obviously be applied whatever be the shape of the ends of the needles or rollers.

By way of example, I have shown, in Fig. 2, needles having more or less elongated ellipsoid-shaped ends 5ᵃ.

The invention can also be applied to bearings which do not include the same retaining edges as above described. For instance, it applies to the case of Fig. 7 in which the needles are maintained not at their ends but by means of rings 3ᵃ which act on portions of reduced diameter, at any point of the length of needles 2. The structure of the sleeve might even be adapted to any other kind of bearing, with or without a cage.

I may also, according to the present invention, in the case of some special bearings, make use of two sleeves, coaxially disposed, one on the outside and the other on the inside of the parts that form the bearing.

The sleeve may be made either of a thin metal, or of cardboard, ebonite, or any other suitable material.

While I have described what I deem to be practical and efficient embodiments of the present invention, it should be well understood that I do not wish to be limited thereto as there might be changes made in the arrangement, disposition and form of the parts, as comprehended within the scope of the appended claims.

What I claim is:

1. A method of fitting needle or roller bearings, which comprises, providing a cylindrical sleeve of a diameter substantially equal to that of one of the runways with which the bearing is to cooperate, assembling the elements of the bearing with respect to said sleeve in substantially the relative position that they are intended to occupy finally, fixing said elements in said relative positions with respect to said sleeve for handling or transportation of the whole, rendering said elements again slidable axially with respect to said sleeve, bringing said sleeve into coaxial position with respect to the said runway with which the bearing is to cooperate, and causing the whole of these elements of the bearing to slide along said sleeve into engagement with said runway.

2. As a new article of manufacture, a substantially rigid temporary sleeve, bearing elements assembled with each other and with said sleeve and held thereby in substantially the relative positions that they are to occupy when working, and removable fixation means on said sleeve for retaining said elements against accidental dislocation.

3. An article of manufacture according to claim 2 in which the elements of the bearing assembled with the temporary sleeve include means adapted to limit the axial displacements of the rolling elements when the bearing is fitted definitively.

4. An article of manufacture according to claim 2 in which the elements of the bearing assembled with said temporary sleeve include thrust means adapted to limit the axial displacements of the rolling elements when the bearing is finally mounted, said thrust means being so shaped as to limit radial displacements of the rolling elements with respect to the temporary sleeve.

5. The method of fitting needle bearings or the like which comprises arranging needles in an annular series adjacent the wall of a sleeve with rings in retaining relation to the ends of the needles, bringing the sleeve into coaxial relation with the part to receive the bearing, and then sliding the annular series of needles and the rings as a unit from the sleeve into operative position with said part.

6. An assembly for installing a bearing on a machine part comprising a sleeve, and bearing elements carried by said sleeve in substantially the relative positions they are to occupy when the bearing is installed on said machine part, said sleeve and the bearing elements thereon being adapted to permit the bearing elements to be displaced from the sleeve as a unit and move into operative position on the machine part.

7. An assembly for installing a bearing on a machine part comprising a sleeve, and bearing elements carried by said sleeve in substantially the relative positions they are to occupy when the bearing is installed on said machine part including an annular series of bearing needles adjacent the wall of the sleeve and retaining means with which the ends of the needles cooperate, said sleeve and the bearing elements thereon being adapted to permit the bearing elements to be displaced from the sleeve as a unit and moved into operative position on the machine part.

8. An assembly for installing a bearing on a machine part comprising a substantially rigid sleeve, and bearing elements carried by said sleeve in substantially the relative positions they are to occupy when the bearing is installed on said machine part including needles in an annular series adjacent the wall of the sleeve and rings cooperating with the ends of the needles, said needles and rings being removably retained by the sleeve whereby they are adapted to be displaced as a unit from the sleeve and into operative position on said machine part.

9. An assembly for installing a bearing on a machine part comprising a substantially rigid sleeve, and bearing elements carried by said sleeve in substantially the relative positions they are to occupy when the bearing is installed on said machine part including needles arranged in an annular series adjacent the wall of the sleeve and having reduced end portions and axially spaced rings having portions overlapping the reduced end portions of the needles, said needles and rings being retained by the sleeve but adapted to be displaced axially therefrom as a unit into operative position on said machine part.

10. An assembly for installing a bearing on a machine part comprising a substantially rigid sleeve, and bearing elements carried by said sleeve in substantially the relative positions they are to occupy when the bearing is installed on said machine part including needles arranged in an annular series adjacent the wall of the sleeve and having reduced end portions and axially spaced rings frictionally held by the sleeve and having portions overlapping the reduced end portions of the needles, said rings and needles being adapted to be displaced axially from the sleeve as a unit into operative position on said machine part.

11. An assembly for installing a bearing on a machine part comprising a substantially rigid sleeve, and bearing elements carried by said sleeve in substantially the relative positions they are to occupy when the bearing is installed on said machine part including needles in an annular series adjacent the wall of the sleeve and rings cooperating with the ends of the needles, said sleeve having means extending substantially radially thereof which normally retains said elements and sleeve in assembly but which permits the rings and needles to be displaced axially of the sleeve as a unit into operative position on the machine part.

12. An assembly for installing a bearing on a machine part comprising a substantially rigid sleeve, and bearing elements carried by said sleeve in substantially the relative positions they are to occupy when the bearing is installed on said machine part including needles arranged in an annular series adjacent the wall of the sleeve and having reduced end portions and axially spaced rings having portions overlapping the reduced end portions of the needles, said sleeve having means extending substantially radially thereof which normally retains said elements and sleeve in assembly but which permits the rings and needles to be displaced axially of the sleeve as a unit into operative position on the machine part.

13. A method of fitting needle bearings or the like comprising providing a substantially rigid sleeve of a diameter corresponding substantially with that of one of the runways with which the bearing is to cooperate, positioning a set of bearing elements adjacent the wall of said sleeve and temporarily retaining the same relative to each other and to the sleeve in the arrangement they are to occupy when working and thereby constituting said sleeve a temporary container package which holds said elements in said arrangement, bringing said sleeve into coaxial relation to said one runway, and displacing said elements axially from said sleeve into engagement with said runway.

14. As an article of manufacture, a set of bearing elements disposed relative to each other in substantially the arrangement they are to occupy when working, and a substantially rigid temporary sleeve retaining said elements in said relative arrangement, said sleeve constituting a container package for said elements and being adapted to permit displacement of said elements therefrom as a unit for working assembly with a bearing part.

15. As an article of manufacture, a substantially rigid temporary sleeve, rolling bearing elements assembled with each other and with said sleeve in substantially the relative working positions that they are to occupy when subsequently displaced from the sleeve into cooperating relation with a bearing race, and means on said sleeve for temporarily retaining said rolling elements against accidental dislocation including means adapted to limit radial displacement of the rolling elements with respect to said race.

ALFRED OTTO PITNER.